US009428996B2

(12) United States Patent
Nelson

(10) Patent No.: US 9,428,996 B2
(45) Date of Patent: Aug. 30, 2016

(54) TESTING WATER CONTAMINATION AROUND OIL OR GAS WELLS

(71) Applicant: FracTest LLC, Dallas, TX (US)

(72) Inventor: Scott Nelson, Dallas, TX (US)

(73) Assignee: FracTest LLC, Dallas, TX (US)

( * ) Notice: Subject to any disclaimer, the term of this patent is extended or adjusted under 35 U.S.C. 154(b) by 777 days.

(21) Appl. No.: 13/839,092

(22) Filed: Mar. 15, 2013

(65) Prior Publication Data

US 2014/0278112 A1    Sep. 18, 2014

(51) Int. Cl.
*E21B 41/00*    (2006.01)
(52) U.S. Cl.
CPC .................................... *E21B 41/00* (2013.01)
(58) Field of Classification Search
CPC ...... E21B 41/00; E21B 43/26; E21B 43/255; E21B 43/261; E21B 43/14; E21B 47/10; E21B 47/1015; B09C 1/06; B09C 1/00; B09C 1/002; B09C 1/10; B09C 1/08; F23G 7/14; G01V 9/00; G01V 9/02; G06F 17/00
See application file for complete search history.

(56) References Cited

U.S. PATENT DOCUMENTS

| | | | |
|---|---|---|---|
| 8,215,164 B1 * | 7/2012 | Hussain ................. | E21B 43/14 73/152.33 |
| 2013/0197810 A1 * | 8/2013 | Haas ....................... | G01V 9/00 702/12 |
| 2014/0357534 A1 * | 12/2014 | Barron .................... | E21B 43/26 507/140 |

* cited by examiner

*Primary Examiner* — Manuel L Barbee
(74) *Attorney, Agent, or Firm* — Fish & Richardson P.C.

(57) ABSTRACT

Testing water contamination around oil or gas wells. To determine a testing zone around an oil or gas well, multiple variables are received by data processing apparatus. The variables include variables associated with an oil or gas well, variables associated with an entity performing hydraulic fracturing in the oil or gas well, and variables associated with inhabitable regions surrounding the oil or gas well, to name a few. The multiple variables are processed by the data processing apparatus. In response to the processing, a zone around the oil or gas well within which to test for contamination due to the hydraulic fracturing in the oil or gas well is determined.

20 Claims, 8 Drawing Sheets

TESTING WATER CONTAMINATION AROUND OIL OR GAS WELLS

TECHNICAL FIELD

This disclosure relates to computer-implemented methods, computer-readable storage media, and computer systems for testing for contaminants in fluids, such as water, associated with hydraulic fracturing.

BACKGROUND

Hydraulic fracturing (sometimes called fracking) can be used for recovering oil and natural gas from the ground. Fracking can be performed in vertical wells and in horizontal drilling. In horizontal drilling, a drillhole can be created as a lateral that extends parallel with the rock (e.g. shale) maintaining the substance to be extracted (e.g., oil or natural gas). A hydraulic fracture is formed by pumping, for example, a fracturing fluid under pressure. The pressure may cause the rock formation to crack, allowing the fracturing fluid to enter and extend the crack farther into the formation. A solid proppant (e.g. sand or ceramic) may be added to the fracture fluid after the injection stops to keep the fracture open. The propped fracture becomes a permeable conduit through which formation fluids can flow to the well.

Some claim that fracking may result in contamination of ground and drinking water. Although disputed by the oil and gas industry, a concern remains that fracking has an environmental impact on water used and consumed by the public. Some States are passing legislation placing presumed responsibility on oil and gas producers for water contamination near their wells until they can prove otherwise. Current water testing is performed at small, individual laboratories serving local communities.

SUMMARY

This disclosure relates to computer-implemented methods, computer-readable storage media, and computer systems for testing water supplies, for example, water contamination, around fracking wells.

In general, one innovative aspect of the subject matter described here can be implemented as a computer-implemented method to determine a testing zone around an oil or gas well. Multiple first variables associated with an oil or gas well are received. The multiple first variables include one or more first variables associated with a location of the oil or gas well and one or more first variables associated with an age of the oil or gas well. Multiple second variables associated with an entity performing hydraulic fracturing in the oil or gas well are received. The multiple second variables include one or more second variables associated with a past contamination history of the entity. Multiple third variables associated with inhabitable regions surrounding the oil or gas well are received. The multiple third variables include one or more third variables associated with a number of inhabitable regions surrounding the oil or gas well and one or more third variables associated with a distance of the inhabitable regions from the oil or gas well. The multiple first variables, the multiple second variables, and the multiple third variables are processed. In response to processing the multiple first variables, the multiple second variables, and the multiple third variables, a zone is determined around the oil or gas well within which to test for contamination due to the hydraulic fracturing in the oil or gas well.

This, and other aspects, can include one or more of the following features. The zone can be a substantially circular region having the oil or gas well at a center. Determining the zone can include determining a distance from the geometric center to a boundary of the zone within which to test for the contamination. A minimum testing distance from the oil or gas well can be identified. The minimum testing distance is established by government regulations to test for contamination. It can be determined that a distance from the oil or gas well to a boundary of the zone is less than the minimum testing distance. In response, the distance from the oil or gas well to the boundary of the zone can be over-written with the minimum testing distance. The one or more second variables associated with the past contamination history of the entity can include a number of well violations and a number of contamination claims. Multiple fourth variables associated with the oil or gas well can be received. The multiple fourth variables can include one or more fourth variables describing a number of active wells, one or more fourth variables describing a number of orphaned wells surrounding the oil or gas well, one or more fourth variables describing a number of injected wells surrounding the oil or gas well. The multiple second variables and the multiple fourth variables can be processed to determine a first potential travel distance for a contaminant from the oil or gas well. A distance from water acquifer to fracturing zone in the oil or gas well and a number of naturally occurring faults can be received. The distance from the water acquifer to the fracturing zone in the oil or gas well and the number of naturally occurring faults can be processed to determine a second potential travel distance for the contaminant from the oil or gas well. A porosity of a reservoir into which hydraulic fracturing fluids are flowed and an amount of fracturing fluid flowed into the reservoir can be received. The porosity of the reservoir and the amount of fracturing fluid can be processed to determine a third potential travel distance for the contaminant from the oil or gas well. At least one of the multiple first variables, the multiple second variables, or the multiple third variables can include a well spacing, a population density, oil company risk tolerance, and oil company violation history. The well spacing, the population density, the oil company risk tolerance, and the oil company violation history can be processed to determine a fourth potential travel distance for the contaminant from the oil or gas well. Determining a zone around the oil or gas well within which to test for contamination due to the hydraulic fracturing in the oil or gas well can include determining a sum of the first potential travel distance, second potential travel distance, third potential travel distance, and fourth potential travel distance and assigning the sum as the distance in the zone within which to test for the contamination. An estimate of pressure and temperature along the oil or gas well and potential failure or pressure losses in the oil or gas well can be received. The zone around the oil or gas well within which to test for contamination due to the hydraulic fracturing in the oil or gas well can be determined based on the estimate of the pressure and the temperature and the potential failure or the pressure losses.

Another innovative aspect of the subject matter described here can be implemented as a computer-readable medium storing instructions executable by data processing apparatus to perform the operations described here. A further innovative aspect of the subject matter described here can be implemented as a computer system that includes data processing apparatus and a computer-readable medium storing instructions executable by data processing apparatus to perform the operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
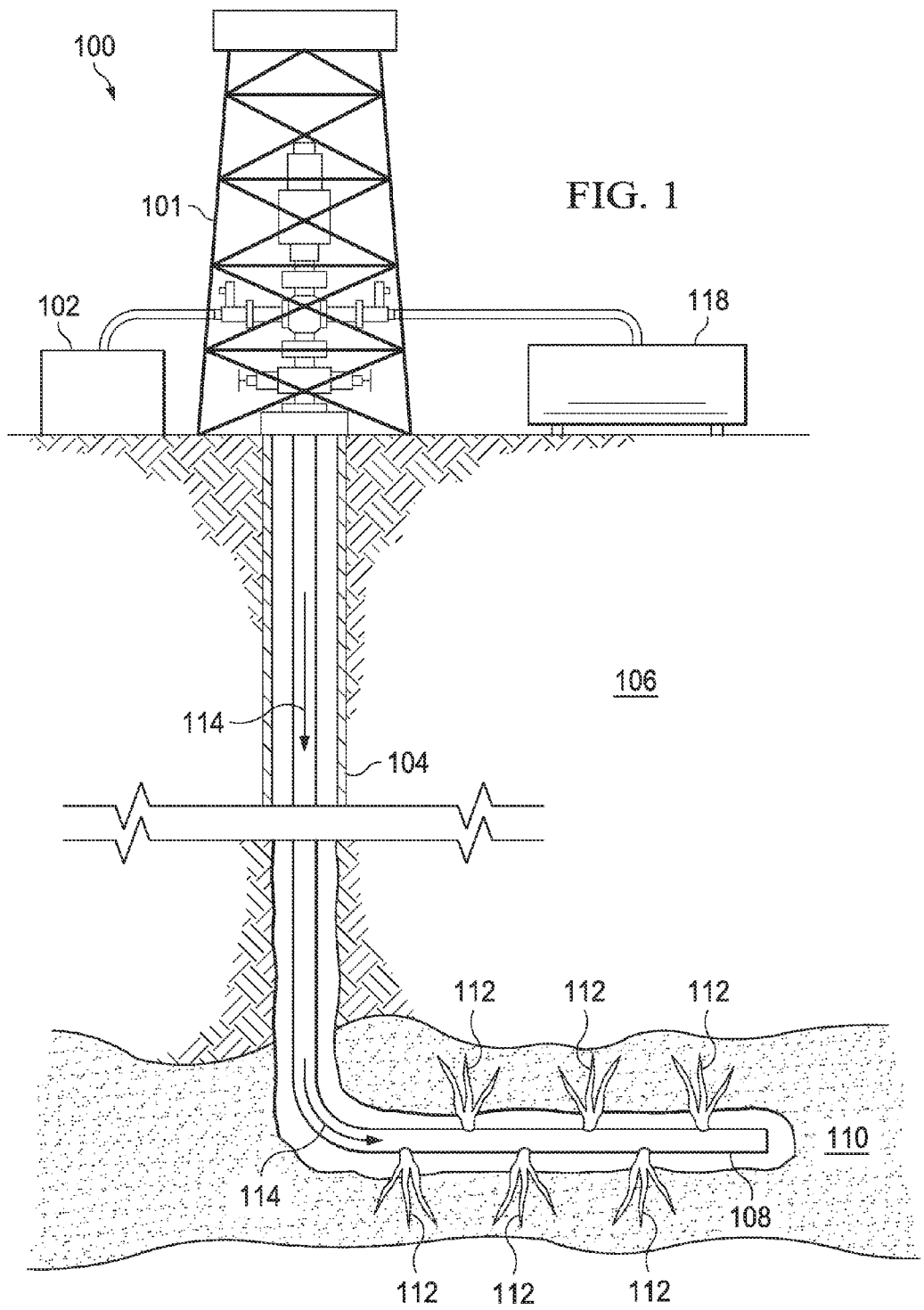
FIG. 1 is cut-away view of an exemplary hydraulic fracturing (or fracking) system.

This disclosure relates to computer-implemented methods, computer-readable storage media, and computer systems for testing water supplies, for example, water contamination, in hydraulic fracture ("fracking") sites. Hydraulic fracturing can enable production of oil and natural gas from the rock bed 110 deep below the earth's surface (e.g. 5000-20,000 feet). At such a depth there may be insufficient permeability in the rock bed 110 to allow oil or natural gas to flow from the rock bed 110 into the wellbore at economic rates. Creating conductive fractures in the rock may be used to increase the extraction of oil and gas from the reservoirs in the rock bed 110 beyond what can be extracted using natural flow. Fracking is especially useful in shale reservoirs because shale has a low permeability compared other rock types. Fractures caused by fracking in shale, for example, provide a conductive path connecting trapped oil and gas to the wellbore 104, which may increase the volume of liquids and gas that can be recovered from the shale reservoir.

There can be several sources of water contamination caused by gas and oil extractions, for example, transportation to site, onsite spills and leaks, portion of fracturing fluid returned back from the well, or combinations of them. Two methods for water contamination are well casing failure, and contaminant migration through fracturing. In oil industry, a casing is installed after and during drilling generally to minimize or prevent contamination of fresh water, support formations from caving-in and to later use high density drilling fluid to continue drilling. Such procedures can provide a safe guard and protect oil wells and water resources. Nevertheless, there is a possibility for wells to fail due to lack of experience, standards, and regulations involved in designing, building and operating these wells. Also, if all precautions have been taken in designing and building these wells, there is a time when a well reaches end of life due to aging and the impact of the surrounding environment that involve high variations in pressure and temperature.

Some have claimed that fracking may result in contamination of ground and drinking water. Although disputed, a concern remains that fracking has an environmental impact on water used and consumed by the public. This disclosure describes computer systems and computer-implemented methods that may be used to test for water contamination. As described below, the techniques described here can be implemented to determine water contamination due to well casing failure or due to contaminant migration through fracturing, or both.

The techniques described here can be implemented during a monitoring period of drilling, fracturing and production from gas and oil wells. Implementing the techniques can enable a user to generate data and to compare the data for future uses and for accurately assessing the influence of oil industry on water resources, for example, drinking water. An estimate for potential contamination migration travel distances from target sites to water resources can be determined and provided, for example, to entities that engage in or plan to engage in fracking at those sites. Exemplary implementations are described below with reference to oil industries and hydraulic fracturing.

The techniques can alternatively or in addition be applied to other industries that involve transporting fluids, where an effect of the fluids on the environment, for example, a potential of the fluids to pollute water resources and environment, is of interest. While fracking is typically used to enhance production from oil and natural gas wells, it may also be used in other applications, and one of skill in the art will appreciate that the present invention may be used in these applications. For example, such applications include stimulating groundwater wells, preconditioning rock for caving in a mine or inducing rock to cave in a mine, enhancing waste remediation processes, disposing of waste by injection into deep rock formations, measuring the stress in the earth, heat extraction to produce electricity in geothermal systems, and increasing injection rates for geologic sequestration of carbon dioxide. The methods and systems of the present invention may be used in connection with any such tacking processes in the event they cause, and to test for, water contamination.

As described below with reference to the following figures, the techniques described here can be implemented as a computer software application including computer instructions stored on a computer-readable medium and executable by data processing apparatus. For example, the computer software application can be implemented by a data processing apparatus 501 described with reference to FIG. 5. The data processing apparatus 501 can be any computer system, for example, a desktop computer system, a laptop computer system, a tablet computer system, a smartphone, a personal digital assistant (PDA), a server computer system, or any other suitable computer system.

FIG. 1 shows a cut-away view of an exemplary hydraulic fracturing (or fracking) system 100. The system 100 can include a riser 101 with a pump 102 and a wellbore 104 extending beneath the riser 102. In some implementations, the wellbore 104 is drilled vertically downward for some distance through rock formations 106. The rock formations 106 can include a single formation, multiple formations, or portions of formations. After vertical drilling, the well may be directed in a direction angular to the vertically downward wellbore 104, for example, in a horizontal direction 108, through a rock bed 110 that holds oil or natural gas. Exemplary rock formations include sandstone, limestone, shale, and coal beds. The bed 110 can be something other than rock, for example, shale. The horizontal (or lateral) bore 108 generally extends parallel with the rock bed 110 containing the substance to be extracted.

As shown in FIG. 1, hydraulic fractures 112 are formed in the rock bed 110 by pumping fracturing fluid 114 into the wellbore 104. The fracturing fluid 114 can be held in a tank or tanks, a reservoir, or be brought to the well in a vehicle. As shown in the illustrated example, the fracking fluid 114 is held in a tank. The fluid 114 is pumped into the wellbore 104 at a rate sufficient to increase the pressure downhole to exceed the fracture (or pressure) gradient of the rock 110. The rock 110 cracks and the fluid 114 continues into the rock 110, extending the fractures 112 further into the rock bed 110. A proppant, such as grains of sand, ceramic, or other particulates, can be introduced with the fracking fluid 114 to prevent the fractures 112 from closing when the injection is stopped and the fluid pressure reduced. The propped fractures 112 are permeable enough to allow the flow of fluids through the fractures 112 to the wellbore 104. These fluids may include oil, natural gas, salt water, and/or fresh water. The oil or natural gas extracted through the fractures 112 and wellbore 104 may be stored above ground in stationary tanks 118 or other suitable means such as tanker trucks (not shown).

Figure 2:
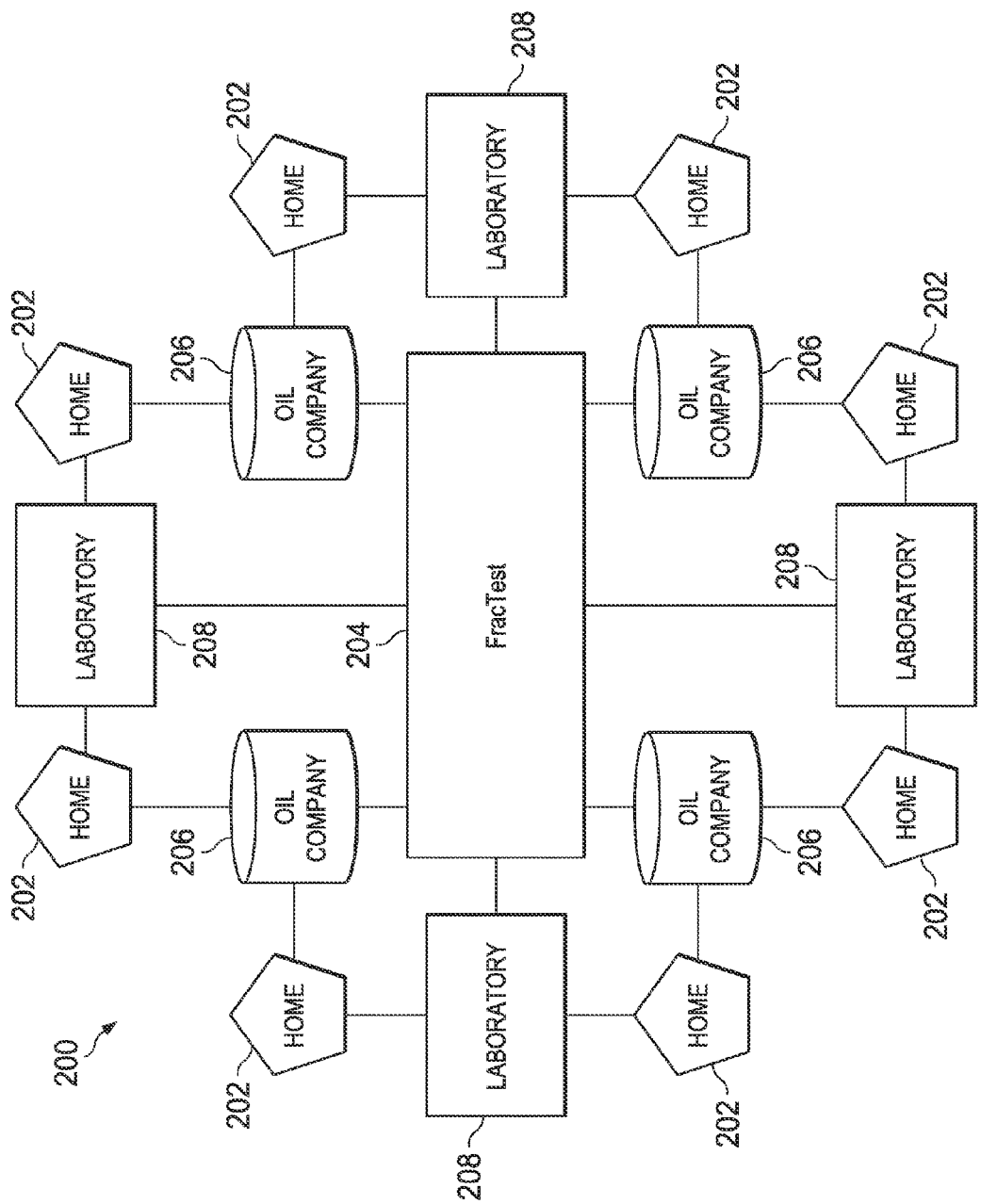
FIG. 2 shows an exemplary system for testing water contamination that may result from fracking.

FIG. 2 shows an exemplary system 200 for testing water contamination that may result from fracking. The pentagon shapes 202 on the perimeter of FIG. 2 are labeled "Home". This indicates a home that may be near a fracking site. Alternatively, the homes 202 may be businesses or any other institution or facility whose water may be contaminated from a fracking well. In general, the pentagon shapes 202 can represent any inhabited structural entity. An intermediary 204 may be formed between oil producers 206 and water testing laboratories 208 in a geographic region. Multiple such intermediaries may be formed in multiple geographic regions, for example, throughout the country.

In FIG. 2, the producers 206 are labeled as "oil producers," but, alternatively or in addition, can be any type of drilling production company, for example, a natural gas company or producer of natural gas. The oil producers 206 may be any oil company that drills wells using the hydraulic fracturing process. The laboratories 208 may be any EPA certified laboratory that performs water-testing services. FIG. 2 shows an exemplary relationship between the oil producers 206, the homeowners 202, and the independent laboratories 208 performing the water testing service. Because the water testing industry is primarily composed of small, independent laboratories across the United States, a network of smaller laboratories may be linked together to create a cohesive nationwide service for oil and gas companies to consolidate their water testing needs. Implementations of the technique described here can allow, for example, a network of smaller laboratories to provide a larger array of services nationwide, not limited by individual lab capacity. Alternatively or in addition, the techniques described here can be applied to larger laboratories or other water-testing companies.

Figure 3:
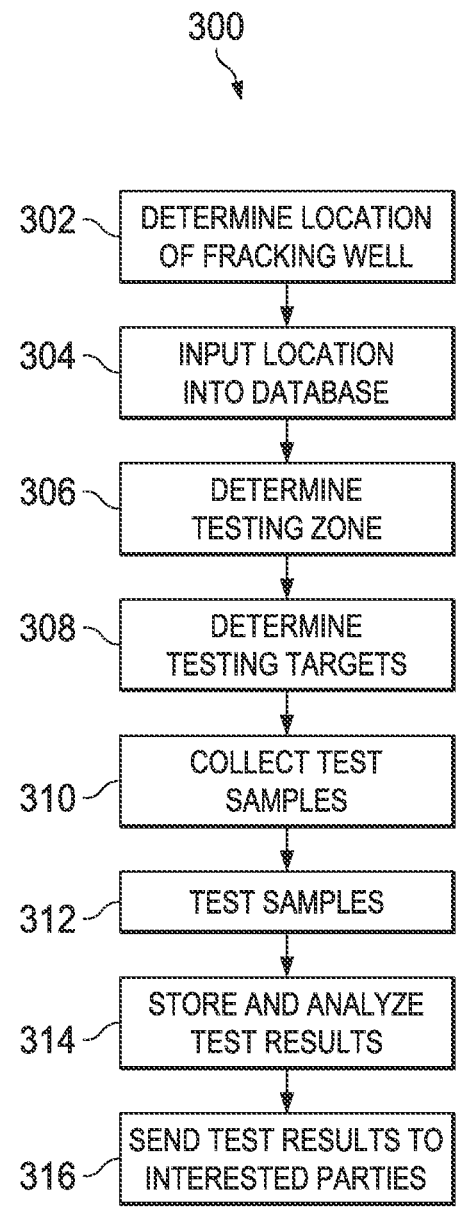
FIG. 3 is a flow diagram showing an exemplary process for determining when to test for water contamination and for performing the testing.

FIG. 3 is a flow diagram showing an exemplary process 300 for determining, estimating, or computing an area (or zone) of potential contamination and for performing testing of water for contamination. The process 300 can be implemented as a computer software application including computer instructions stored on a computer-readable medium and executable by data processing apparatus. For example, the process 300 can be implemented by the data processing apparatus 501. At 302, the location of (and optionally other data relating to) a fracking well can be determined. Alternatively, the location of the fracking well may be determined at a later stage, e.g. after a testing zone is determined, as will be explained below, or may occur in parallel with determining the testing zone. In some implementations, determining the location of the fracking well can involve locating one or more wells, and can use GPS. For example, the oil or gas company that owns or runs the well may provide GPS coordinates for their corresponding wells either in hard copy or electronically. Alternatively, the location of the fracking well may be obtained by from a state oil and gas agency or by examining satellite Earth data, for example, using FlashEarth, NASA's Earth Observatory, Google Earth, or equivalent.

The data processing apparatus 501 can receive additional data regarding the well, including, for example, drilling permit information, which may include the well API number, GPS coordinates, depth of ground water aquifer, depth of the target formation where the oil or gas or other natural resource is located, and the area covered by the formation. The data processing apparatus 501 can search a database belonging to the county or state where the well is located for this information. Alternatively, or in addition, the data processing apparatus 501 can receive the additional metadata as input from a user of the data processing apparatus 501. In some situations, the oil or gas company may provide this information electronically, or via mail or facsimile. At 304, the location determined at 302 can be input into a database connected to the data processing apparatus 501.

Figure 5:
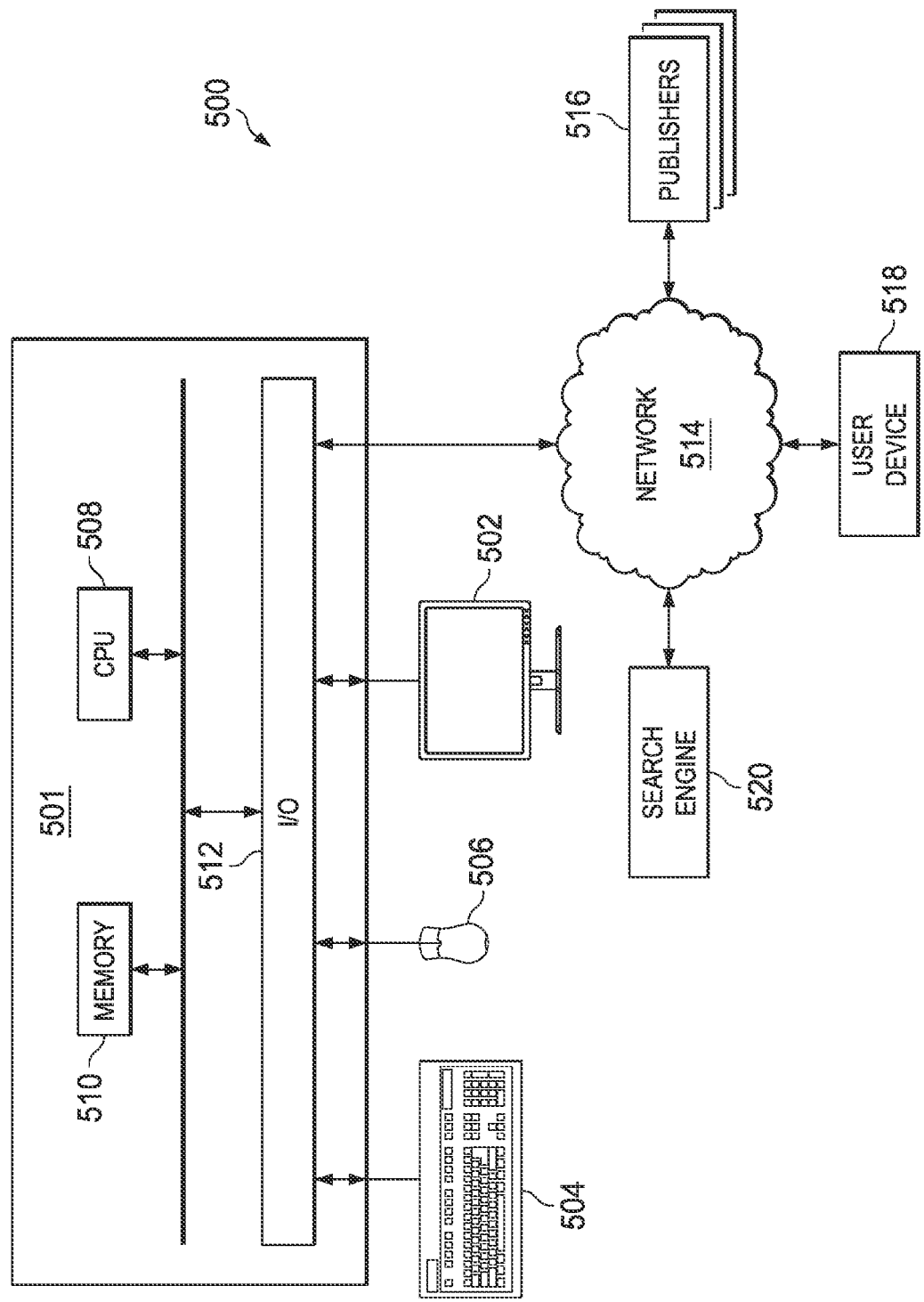
FIG. 5 is an exemplary computer system that may used in connection with the methods and systems disclosed herein.

FIG. 5 is a block diagram showing an exemplary computer system 500 that may be used in determining the location of the fracking well 302, and may also be used in connection with additional steps 306, 308, and 310 described below. The computer system 500 includes a data processing apparatus 501 that may include, as shown, a display 502, a keyboard 504, a mouse 506, a CPU 508, memory 510, an input/output ports 512. In addition, a computer network 514, such as a local area network (LAN), wide area network (WAN), the Internet, or a combination thereof, may be used to connect the data processing apparatus 501 to publisher web sites 516, to other user devices 518, and to a search engine 520. The online environment may include many thousands of publisher web sites 516 and user devices 518.

At 306, a testing zone is determined. The process of determining the location of the fracking well (step 302) may be performed before or after determining the testing zone 306, or the processes may be performed in parallel. Exemplary techniques for determining the testing zone are described below with reference to FIG. 6. Alternative algorithms, such as those described below, may be employed.

Figure 4A:
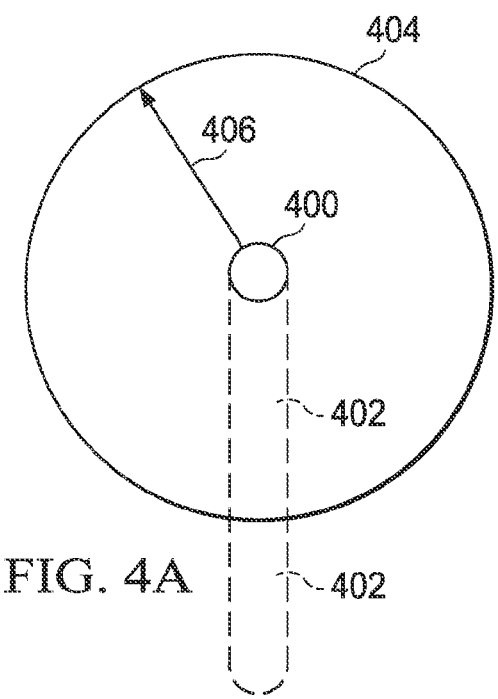
FIGS. 4A and 4B show two exemplary alternatives for the testing zone around a fracking well
Figure 4B:
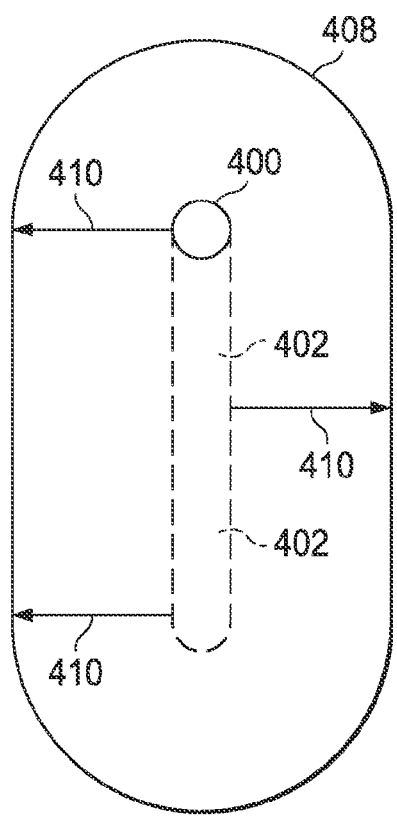

FIGS. 4A and 4B show two exemplary alternatives for the testing zone around a fracking well. FIG. 4A is an overhead view looking down toward the Earth's surface showing where a vertical well bore 400 enters the ground. A horizontal well bore 402 is shown with dashed lines extending horizontally away from the vertical well 400. In this example, the testing zone lies within a circular perimeter 404 having a radius 406. The radius 406 may be determined, for example, by federal and/or state minimum requirements. When the radius 406 is larger than these minimum requirements or when additional factors (as described in detail below) affect the radius 406, or when the radial distance from the vertical well bore 400 to the perimeter 404 varies depending, for example, on any of the factors described below, the radius 406 can be determined based on the additional factors.

FIG. 4B shows an alternative testing zone for the same fracking well. Here, the testing area lies within an elongated circular (or semi-elliptical) perimeter 408 extending a substantially uniform distance 410 from the vertical well 400 and its horizontal bore 402. Again, the distance 410 may be larger than the minimum state and/or federal requirements, or the radial distance from the vertical well bore 400 to the perimeter 408 may vary depending, for example, on any of the factors described below in which case the distance 410 can be determined in accordance with additional factors (as described in detail below). Thus, the testing zone may have different shapes and need not be centered at or extend uniformly from the well. For example, as will be described again below, there may be situations where greater population density lies on one side of the well, and in these cases it may be desirable to extend the testing area further on the side where the population density is greater. An exemplary algorithm for determining the testing zone is described below in connection with FIG. 6.

A large quantity of contamination may occur at the vertical well bore. For example, if the horizontal or lateral fracking bore is deeper than the water aquifer(s) around the well, there is a lower likelihood that fracking materials introduced along the deeper horizontal bore will penetrate and contaminate the water aquifers, which in some cases may be thousands and even tens of thousands of feet above (or even below) the horizontal bore. However, as the well bore rises-up vertically to the earth's surface, it may run through (or close to) one or more aquifers and thus potentially contaminate the water. Thus, in many situations, the testing zone may be a circular (or other shape) centered (or substantially centered) at the location of the vertical well bore. Alternatively, the testing zone may be formed around the entire fracking area, including along the horizontal well bore.

At 308, testing targets are determined within the testing zone. The targets may be single family homes, apartment or condo buildings, businesses, government installations, well water, surface water, or any other object or entity where drinking or consumable water is present or used. At least some of the testing targets may be determined by examining satellite Earth data, for example, using FlashEarth, NASA's Earth Observatory, Google Earth, or equivalent. Residential structures may be located using Zillow.com or an equivalent resource that provides for locating homes and/or businesses. In some instances, water can be tested even when a structure is located outside the testing zone, for example, a residential or business-related structure lying outside the testing zone, but having associated land lying within the testing zone. Similarly, there may be farms where the living quarters are outside the zone, but water used by livestock or other farm animals lies within the zone (e.g. a drinking trough, well, lake, pond, or stream). In these situations, it may be desirable to test the water used by such livestock or animals. In addition, testing may be performed on an aquifer that lies within the testing zone. Information locating such aquifers may be obtained by geologic surveys and other means. The process for locating testing targets will be described below in connection with FIG. 9.

At 308, each home/business is contacted through any suitable means, for example, telephone, direct mail, or directly by a company representative or sub-contractor. The home/business owner has the option to have their water tested and paid for by the oil company, or may decline. Either decision will preferably be documented for records. In addition, or as an alternative, all oil companies that are drilling within a predetermined distance (e.g., 3000 feet) of a home or business may contact the surface owner. This contact information may be made available to the intermediary 204 to facilitate testing.

At 310, test samples can be collected. For example, an intermediary 204 is established to work with the oil and gas companies 206 and water testing laboratories 208. The intermediary 204 may create a network of EPA certified independent water testing laboratories 208 linked together to create a cohesive nationwide (or regional) service for oil and gas companies to consolidate their water testing needs. The intermediary 204 may identify the location of the wells (as in 302 and 304), determine the testing zone (as in 306), and identify the testing targets (as in 308). The testing laboratories 208 may be independent organizations separate from the intermediary 204, or the intermediary 204 and testing labs 208 may a single business entity. Alternatively, the intermediary 204 may have some of its own affiliated labs and outsource to other, independent labs. The intermediary 204 may also work with oil and gas companies 206 to obtain well locations and other related information (for example, at 302) and to determine testing zones (for example, at 306). The intermediary 204 may work with the oil and gas companies 206 to provide reliable, regional, or nationwide testing of fracking wells to determine if humans and animals residing or working in the vicinity of fracking wells are at risk from contaminated water. The nearest laboratory 208 to each well may be dispatched to collect a water sample from the homes within the testing range for analysis.

At 312, test samples can be tested 312 at one or more testing laboratories 208. Each laboratory 208 will preferably practice a standard operating procedure, legally defensible chain-of-custody process by collecting the samples in a specific way, performing on-site tests, and filling out the associated documents on-site and upon arrival at their respective laboratories. Each independent laboratory's processes can be uniform and monitored to assure proper compliance with standards set by the intermediary 204. For example, the testing process may involve determining whether contaminant levels have changed from a pre-drilling/pre-fracking test. The intermediary 204 may put together a range of safe contaminant levels within drinking water. If the contaminant levels exceed this range the oil or gas company 206 and the homeowner 202 may be notified and proper steps may be taken to remedy the problem.

All test results will be sent to a central location electronically and hard copy to implement into a centralized database. Each set of results will be run against the safe standards set firth by the EPA. All contaminants that are outside of the safe parameter will be flagged. Once entered into the central database, the test results will be sent to the oil or gas company 206 for their own records. The homeowner may request their respective test results at any time after they have been implemented into our database or may access their test results online.

Figure 6:
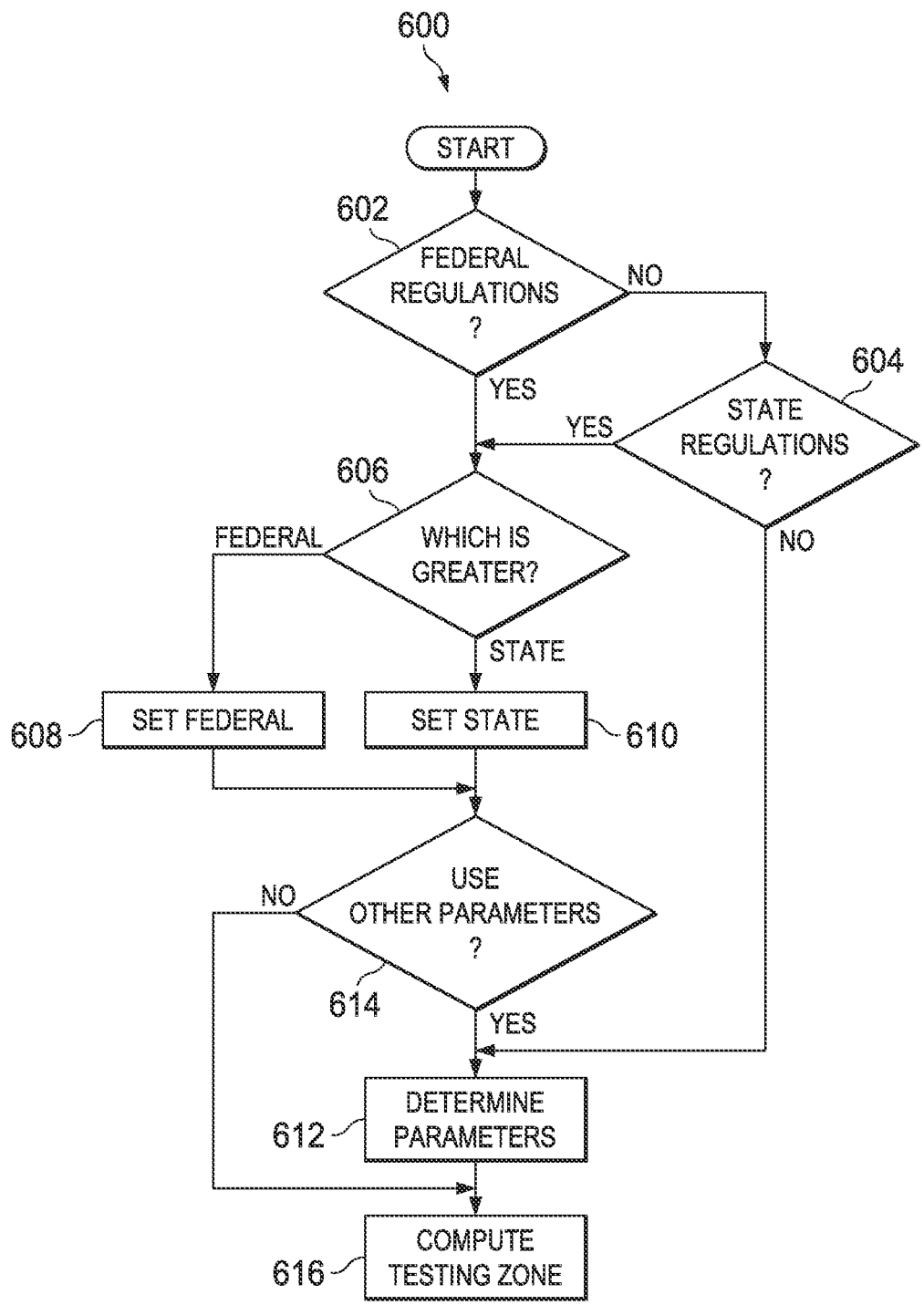
FIG. 6 shows a flow diagram illustrating an exemplary process for determining a testing zone.

FIG. 6 shows a flow diagram illustrating an exemplary process 600 for determining a testing zone 306. The process 600 can be implemented as a computer software application including computer instructions stored on a computer-readable medium and executable by data processing apparatus. For example, the process 600 can be implemented by the data processing apparatus 501.

At 602, it can be determined if there is existing federal legislation (or administrative rules or other requirements) setting minimum testing parameters and/or distances for testing. If so, then these parameters and/or distances may be set for the minimum testing distance around the well and/or fracking site. Currently, however, there are no federal guidelines determining baseline water testing parameters near fracking sites. In the absence of federal legislation or other federal requirements, at 604, it can be determined if there is state legislation (or administrative rules or other requirements) for the state where the well exists setting minimum testing parameters and/or distances for testing. If so, then these state parameters and/or distances may be set for the minimum testing distance around the well and/or fracking site.

If there are both federal and state requirements, then the two are compared 606. If federal exceeds state in at 606, then federal testing parameters and/or distance are set at 608. If state exceeds federal in 606, then state testing parameters and/or distance are set at 610. If federal and state are the same, either (or both) may be used. In these cases, the distance may be a radius if the zone to be tested lies around a point, e.g., a well bore (e.g., as in FIG. 4A above). Alternatively, the testing zone may be a shape other than a circle, e.g. a triangle, oval, ellipse, or other shape, and in such cases the distance may define at least a portion of the perimeter of this zone (e.g., as in FIG. 4B above). In general, the testing zone may be any shape or size and may extend non-uniformly from the vertical well bore or the horizontal extension of the fracking area, and the use of testing parameters and testing distances is not intended to limit the testing zone in any way.

If neither federal nor state regulations exist, then, at 612. One or more testing parameters may be applied to determine the testing zone. Alternatively, if minimum federal and/or state regulations exist, at 614, it can be determined whether to use additional parameters. If yes, then at 612, additional parameters can be applied to determine whether the testing zone should be expanded in any way beyond the federal and/or state minimum. If the decision at 614 is not to use additional parameters, then, at 616, the testing zone can be computed.

In 612, the following additional parameters (or factors) may be considered: (1) number of neighboring operating wells; (2) age of neighboring wells; (3) number of neighboring abandoned/orphaned wells: (4) number of neighboring injection/disposal wells: (5) number of neighboring contamination claims; (6) well spacing; (7) number of fracs; (8) amount of fracking fluid; (9) distance from the bottom of the aquifer to the top of the reservoir; 10) porosity of the reservoir; (11) groundwater quality samples; (12) surface water quality samples; (13) the oil or gas company's risk tolerance (14) detection of identifiable tracers; (15) population density. In more populated areas, companies may decide to test using a larger range than in a rural, uninhabited area due to increased exposure. Also, in certain areas of the country a larger percentage of the populous draws water from individual water wells (not regulated by the EPA) as opposed to city water, which is tested and monitored regularly. The testing area may be determined in 612 using a software program running a computer system 500, as described above in connection with FIG. 5.

Exemplary implementations of the data processing apparatus 501 to determine the testing zone is described here. A user of the data processing apparatus 501 executing the techniques described here can log into an account associated with the user. To create the account, the user can access a webpage of a website hosted by a server computer system connected to the data processing apparatus 501. Through the webpage, the user can create a username and password. Having created the account, the user can provide input parameters to determine the testing zone. The input parameters can include GPS coordinates and well API#.

The data processing apparatus 501 can access at least two types of databases; state database which includes; (well API#, date permit issued, status of the well, well type, operator, formation type, and GPS coordinates) or a client database which includes, for example, name of client, distribution of wells and locations, testing parameter preference, risk level, previous contamination claims, and violations, or both. After the data processing apparatus 501 receives the OPS and API# of the targeted well from the user, the data processing apparatus 501 can implement a look up process to match the targeted well # and the available state's database. The state's database can be organized to include at least four parts; state, county, unique well identifier, and operator name.

Once the entered information matches client and state databases, the data processing apparatus 501 can establish a mathematical model. The data processing apparatus 501 can recognize and classify all the available information around a predetermined distance (for example, 1 mile) of the targeted well based on the status of the well. For example, the data processing apparatus 501 can estimate orthodromic distances between targeted well and all other wells available up to a radius of the pre-defined distance from the targeted well. The data processing apparatus 501 can define a recommended testing radius based on risk level and other hydrological and geological factors which contribute to direct contaminant migration towards water resources.

In some implementations, the data processing apparatus 501 can implement the computer software application to determine water contamination due to well casing failure. Well casing failure is defined in respect to type, age, history of well violation, and contamination claims. Orphaned wells and injection wells may have a higher probability to fail than active wells. As production lines and casings age, the likelihood of failure and leakage can increase. The data processing apparatus 501 can implement the following characterization model that describes the recommended water testing sampling based on a potential casing failure is developed:

$$CVw = PwFail \times PwLeak \times F$$

In the above model, CVw is the contaminant volume leaked from the well casing in $m^3$ per well. PwFail is the probability that the well fails, PwLeak is portion (for example, volume) of the injected fluids that leak from the well, F is an amount of the drilling and fracturing fluid onsite. PwFail and PwLeak are estimates derived from industry literature.

In some implementations, the data processing apparatus 501 can add ages for the available wells within 1 mile (5280 feet) radius from the targeted well and multiply the result by a unique coefficient that accounts for the different types of wells and casing materials. The ages of the wells are calculated based on date of permit issued provided by state records. Well violation histories for the wells within 1 mile radius can be tracked through states' web database. Also, contamination claims can be taken into consideration to adjust potential contaminants migration distances. Updates for client and states' databases will be downloaded on a regular basis to ensure up to date inputs data. The equation presented above can be summarized as follows:

$$D1=\Sigma(AA \times PwFail \times C1)+(OW \times PwFail \times C2)+(IW \times PwFail \times C3)+(WV \times C4)+(CC \times C5)$$

In the above equation, D1 is a potential contaminant travel distance, AA is an active well, OW is a number of orphaned wells, IW is a number of injected wells, WV is a number of well-violations, CC is a number of contamination claims, and C1, C2, C3, C4, and C5 are coefficients.

Figure 7:
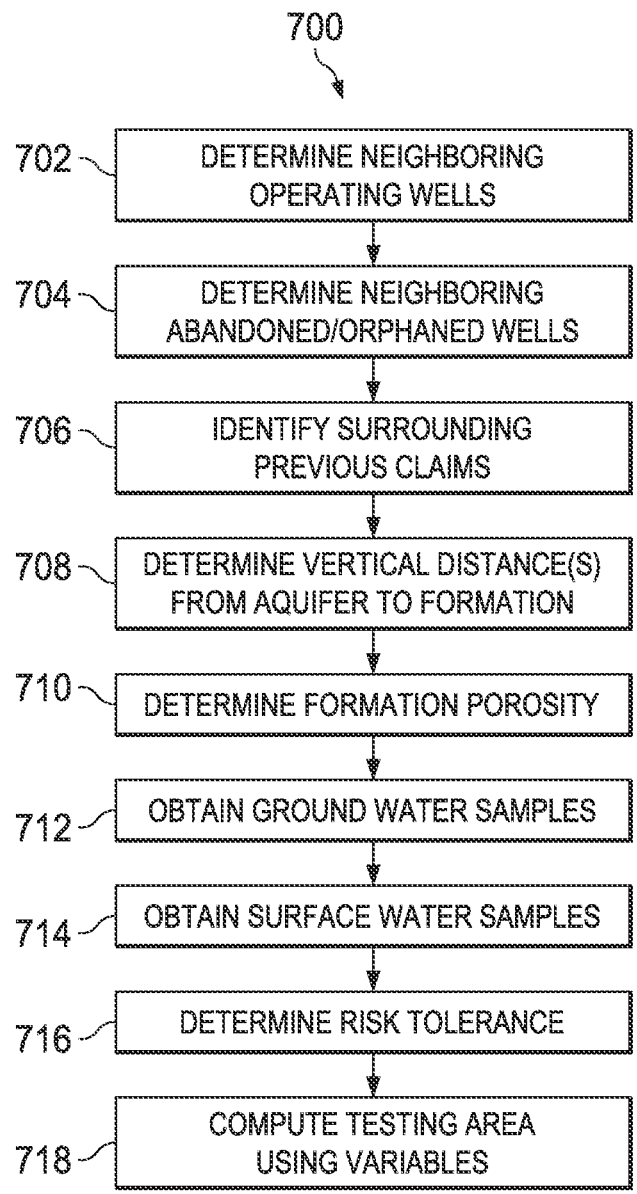
FIG. 7 shows a flow diagram illustrating an exemplary process for determining additional parameters or factors and computing the testing zone.

FIG. 7 shows a flow diagram illustrating an exemplary process 700 for determining additional parameters or factors 612 and computing the testing zone 616 by implementing the equation described above. The data processing apparatus 501 can implement the process 700. At 702, a number of neighboring wells that are operating is determined. Generally, any well within 1 mile (5280 feet) will be considered a neighboring well. At 704, a number of neighboring wells that are abandoned or orphaned is determined. At 706, previous contamination claims from the surrounding area are identified. Subsequent to implementing each of steps 702, 704, and 706, the testing zone may be increased as the number of neighboring active or abandoned or orphaned wells or the number of contamination claims (or combinations of them) increases. Thus the data processing apparatus 501 may account for, and increase, the testing zone, if steps 702, 704, 706 indicate that the testing zone should be expanded beyond the federal or state minimum. In addition, steps 702, 704, 706 may indicate that testing zone should be expanded only in certain portions, and thus not in a uniform fashion. For example, referring to FIG. 4A, if there have been a large number of contamination claims to the left of perimeter 404, the testing zone may be expanded leftward but not in other directions.

In 708, a vertical distance (or distances) from the bottom of an aquifer to the top of the reservoir containing the oil or gas being fracked is determined. In addition, in 710 porosity of the rock formation is determined. Contaminants may reach drinking water aquifers through pathways in the ground. A pathway may be a continuous space between a hydrocarbon-bearing formation and a groundwater aquifer. Four potential pathways have been postulated: (1) natural migration of fluids and gases from the formation to the aquifer; (2) leaky oil and gas well casings; (3) induced fractures connecting with or enlarging existing natural fractures; and (4) induced fractures connecting with abandoned oil and gas wells. If any such pathway is present, fluids that were injected into the oil and gas formation could mix with groundwater. Potential contamination may be detected if the concentration of potential contaminants flowing from the hydrocarbon-bearing formation into the groundwater aquifer is higher than the concentration of the same pre-existing chemicals in the groundwater aquifer. Additionally, detection may occur if the potential contaminant enters the aquifer at a rate that is greater than the groundwater flow rate, so that the contaminant is not diluted to the same level as the pre-existing background water quality.

For example, at 708, if the aquifer is above the target formation, a distance at any point along the bottom surface of the aquifer to the top of the target formation is determined. Alternatively, the distance from the center (oriented vertically) of the aquifer to the center (oriented vertically) of the target formation may be used. As yet another alternative, several points along the bottom surface of the aquifer may be selected, and the vertical distances to the top of the formation may be determined. Various measurements quantifying the distance between the aquifer and the target formation may be used, and the opposite analysis may be employed if the formation is above the aquifer. The threshold may be variable depending on the combined analysis of vertical distance(s) and porosity (from 710). As the vertical distance decreases and the porosity increases, a likelihood that contamination may occur increases.

The second pathway is the probability that contaminants will migrate from fracturing zone to water aquifer. Distance from aquifer to fracturing zone and percentage of naturally occurring faults were the main factors involved in estimating a potential distance of contaminate migration due to fracturing. Faults provide a quick pathway for fracturing fluids to migrate upwards. Some of these faults can be seen in a naked eye and others are not easily detected and can travel long distances from one formation to another providing a pathway for contaminants to travel upwards. Hydrological aquifer maps for each state are going to be used to determine the distances between water aquifer and fracturing zones. Literature review and historical records are going to be conducted to estimate the likeliness of naturally occurring faults. The potential contaminant travel distance due to this pathway is defined as follows:

$$D2=DAZ \times NAF$$

In the above equation, D2 is a potential contaminant travel distance, DAZ is a distance from water aquifer to fracturing zone, and NAF is a number of naturally occurring faults.

The third pathway is to consider the total amount of fracturing fluid shot into the zone in respect to the porosity of the reservoir in creating a proper pressure which assists migrating contaminants towards water bodies. Fracturing zones take place thousands of feet below surface. Also, the deep rocks overlaying the formation that contains oil or gas as the case of the Marcellus shale have very low permeability, but injecting several gallons of fracturing and drilling fluids might have a potential to change the characteristics of these rocks and encourage upward travel of contaminants. The following equation shows the impact of induced fractures on contaminants' travel distances:

$$D3=PR \times FF$$

In the above equation, D3 is a potential contaminant travel distance, PR is a porosity of the reservoir, and FF is an amount of fracturing fluid shot into the zone.

Figure 8:
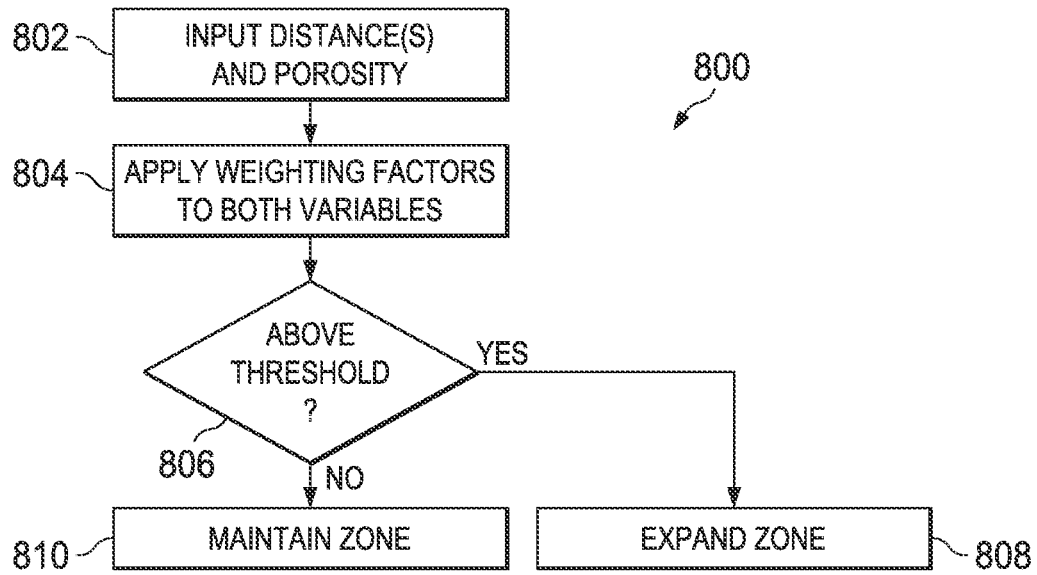
FIG. 8 shows a flow diagram illustrating an exemplary process for using distance(s) and porosity to potentially expand the testing zone.

FIG. 8 is an exemplary process 800 that employs the equation described above using the distance(s) and porosity determined in 708 and 710 to potentially expand the testing zone. The data processing apparatus 501 can implement the process 800. At 802, the distance(s) and porosity values are input. At 804, weighting factors may optionally be applied to each value to arrive at a single value or a pair of values. At 806, a minimum threshold is compared against the weighted distance(s) and porosity value or values. If the distance (or any one of the distances) exceeds the threshold, then the testing zone may be expanded horizontally 808 along the pathway of the horizontal bore 108 to account for potential contamination in the aquifer from the fracking occurring in the horizontal bore 108. An example of a testing zone expanded horizontally along the horizontal bore 108 is shown in FIG. 4B.

If the distance (or any one of the distances) is not above the threshold (and/or the porosity is high), then the testing zone may be maintained radially 810 around the vertical bore 104, as shown in the exemplary testing zone of FIG.

4A. As an alternative, an array of thresholds may be used, and the testing zone may be adjusted increasingly outward depending on the threshold exceeded. For example, if the threshold are graduated, for example, at 500 feet, 1000 feet, 2000 feet, and 5000 feet, then the data processing apparatus 501 may increase the testing by 50% in a particular direction (or uniformly) if within the 500-foot threshold, by 25% if within the 1000-foot threshold, by 12% if within the 2000-foot threshold, and by 5% if within the 5000-foot threshold. The thresholds and expansion parameters may vary depending on other parameters, including, for example, population density, water quality samples, and risk tolerance, as described below.

Another pathway is to look at the surrounding environment: population density, well spacing, oil company risk tolerance and oil company violation history and the risks associated to contaminants migration. Well spacing refers to safe distances between oil and gas wells to minimize or prevent a risk of failure of any of these wells resulting in a migration of contaminants to water resources. Short distances between wells will result in high concentration of contaminants, and faster travel of contaminants. Also, as the population density around the well areas increase, risk of more people consuming contaminated drinking water can also increase. Census data is utilized to determine population density around 1 mile of the targeted well. Review of literature and historical records can be conducted to determine average well spacing around 1 mile of the targeted well area. The following equation shows these variables and their effect on contaminant migration distances:

$$D4=WS+PD+OCRT+OCVH$$

In the above equation, D4 is a potential contaminant travel distance, WS is well spacing, PD is population density, OCRT is oil company risk tolerance, and OCVH is oil company violation history. OCRT and OCVH can be mathematical coefficients input to the equation above. The coefficients can be determined based on information provided by each oil and gas company to determine the company's violation history and risk tolerance. For example, the coefficients can be in the range of 1-100 (or normalized from 0 to 1).

Referring back to FIG. 7, at 712, groundwater quality samples are obtained. At 714, surface water quality samples are obtained. At 716, the oil or gas company's risk tolerance is determined. The USGS maintains a National Water Information System (NWIS), and the EPA maintains a Modern Storage and Retrieval Database (STORET), both of which can be used to search for groundwater quality samples and service water quality samples in the area around the well. At 718, any or all of the parameters determined in the preceding steps are used to compute the testing area. These variables may be weighted, if desired.

The total recommended testing radius from the targeted well would be the sum up of all the previous potential pathways contributions.

$$D=D1+D2+D3+D4$$

Figure 9:
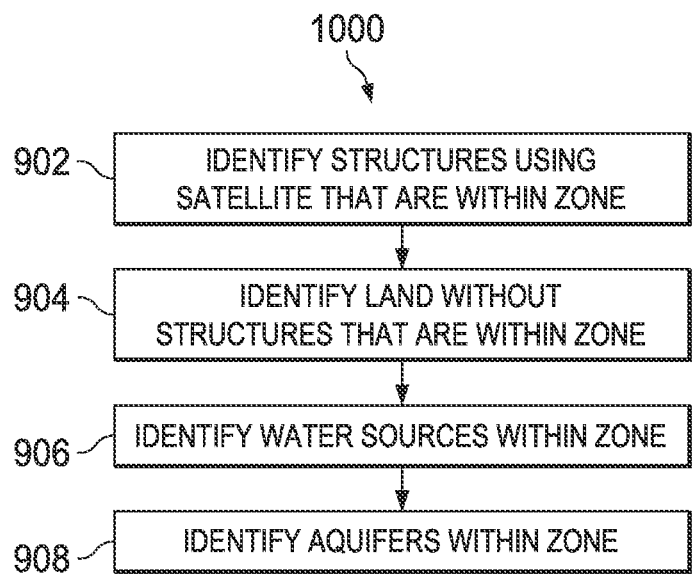
FIG. 9 shows a flow diagram illustrating an exemplary process for locating testing targets.

Any or all of the steps in the process 700 of FIG. 7 will preferably be performed on the computer system 500. As shown in FIG. 9, any combination of these parameters or variables may be weighted, and computer system will produce a recommended testing zone around the well location. Each process will be mutually exclusive and take into consideration a different set of information, which can be determined to carry various levels of risk. With each step, the computer system will potentially add distance associated with each risk level. The computer system will take into consideration all of the factors analyzed and make a final recommendation. Each oil and gas company 206 can add or subtract distance to this recommendation based on their own respective risk tolerance.

The data processing apparatus 501 can enable a user to generate and view GPS coordinates for the recommended testing radius, targeted well, and a laboratory to perform testing within a range of performing service if applicable by implementing map applications, such as Google maps. The data processing apparatus 501 can enable automatic calculation of distances between the coordinates using, for example, "Get Direction function" provided by the map applications. The data processing apparatus 501 can include all laboratory locations (GPS coordinates) within a states' database and can rank the laboratories by factors, for example, price. One or more of the pathways described above can be implemented by the data processing apparatus 501, as described below with reference to FIG. 7. FIG. 10 shows an exemplary process 1000 for identifying properties to be tested. This process is preferably performed using a computer system like 500 shown in FIG. 5. At 1002, a satellite location system, such as FlashEarth, NASA's Earth Observatory, or Google Earth, is used to identify at least some of the structures within the testing zone. At 1004, any home or business structure that lies outside the testing zone but has land within the testing zone is identified. At 1006, water sources within the testing zone are identified that are not related to a structure, but are used by humans or livestock (e.g., a drinking trough, well, lake, pond, or stream). At 1008, any aquifer that lies at least partly within the testing zone is identified.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e. one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In addition to the previous methodology of estimating potential contaminants migration based on probability assessment, a mathematical model is developed to estimate pressure and temperature along oil and gas wells and potential failure or pressure losses. The source of contamination, i.e., a gas/oil well, is identified. The following data is obtained from gas/oil companies: diameter of casing, total length of the well, surface temperature, bottom temperature, Gas Liquid Ratio, oil gravity, wellhead pressure, pipe roughness, incline angle, oil flow rate, water oil ratio, gas gravity, and water gravity. This data is used to establish multiphase calculations to estimate multiphase fluid properties. Pressure traverse in multiphase flow vertical pipe is applied. In other words, gas and oil properties along the well are calculated and pressure of fluid along the well is estimated. After calculating these properties, the probability that the well will fail or have a crack, and a depth at which the failure or the crack will occur will be evaluated based on historical records and manufacturer standards.

From the multiphase calculations described above, the pressure of fluid (pressure losses) around the area that has a potential to fail and a velocity of flow exiting the well to the formation are estimated. If there is no potential failure in the casing, pressure losses from fractured zone are estimated. Subsequently, contaminant travel time based on the age of the well and accordingly travel distances are evaluated. Two assumptions are made—homogeneous aquifer, and steady state flow. Also, additional assumptions related to geology of the formation are defined.

The modified Hagedorn and Brown method (mH-B) is applied to estimate pressure losses along the well. This method provides an empirical two-phase flow correlation based on the original work of Hagedorn and Brown. These correlations are selected based on the flow regime as follows. Bubble flow exists if the no-slip holdups $\lambda g < L$, where $$L_D = 1.071 - 0.2218\left(\frac{u_m^2}{D}\right)$$

and $L_B \geq 0.13$. Thus, if the calculated value of $L_B$ is less than 0.13, $L_B$ is set to 0.13. If the flow regime is found to be bubble flow, the Griffith correlation is used; otherwise, the original Hagedorn-Brown correlation is used $$\frac{dp}{dz} = \frac{g}{g_c}\bar{\rho} + \frac{2f\bar{\rho}u_m^2}{g_c D} + \bar{\rho}\frac{\Delta(u_m^2/2g_c)}{\Delta z}$$

where, dp/dz is a pressure gradient, g is gravitational acceleration, f is friction factor, and $\bar{\rho}$ is in-situ average density. Further, $\Delta z$ is length, D is inner diameter of casing, and $u_m$ is mixture velocity and which equals:

$$u_m = u_{sl} + u_{sg}$$

where, $u_{sl}$ is superficial velocity for liquid, $u_{sg}$ is superficial velocity for gas.

The Griffith correlation uses a different holdup correlation, and it is applied when flow is considered bubble flow. It bases the frictional pressure gradient on the in-situ average liquid velocity, and neglects the kinetic energy pressure gradient $$\frac{dp}{dz} = \frac{g}{g_c}\bar{\rho} + \frac{2f\rho_l\bar{u}_l^2}{g_c D}$$

Additional factors can be considered to better assess contaminants migration (direction and quantity): formation type, permeability, conductivity, local flow gradient, aquifer geology and hydrology. The hydraulic head can determine the rate of flow. To reflect a correlation and influence of geological and hydraulic parameters on groundwater flow and accordingly contaminant flow, a joined equation between Darcy and Piselle's laws can be developed. Combining the two equations can result in a method to estimate the amount of water (Q) flowing through porous media depending on the energy driving the water flow ($\Delta h/\Delta L$) and the hydraulic conductivity (K) of the porous media. Moreover, by considering the age of wells surrounding the targeted well an estimate of the velocity of flow over time and accordingly travel distance of contaminants can be determined.

Darcy Law $$Q = \frac{-kA}{\mu}\frac{(P_b - P_a)}{L}$$

where, Q is volumetric flow rate, K is permeability, μ is viscosity, A is cross sectional area to flow, (Pb−Pa) is pressure drop between two points, and L is length or distance between two points.

Poiseuille Law $$\Delta P = \frac{128\mu LQ}{\pi d^4}$$

where, ΔP is pressure drop, μ is viscosity, L is length of pipe, Q is volumetric flow rate, π is a mathematical constant, and d is diameter of pipe.

The afore-described calculations can be based on type, and chemical nature of contaminants regardless of the nature of the fluid, for example, natural gas, wastewater from hydro-fracturing, or oil. The rate of gas flow can be greater than the rate of oil flow. Also, reaction of gas with water and rock (formation) can be different from that of gas. Most petroleum products do not readily dissolve in groundwater: instead, either floating at the top of the water table or sinking to the bottom of the aquifer. By understanding the chemical nature of the contaminants, the behavior of the contaminants with formation and rate of travel movement can be studied. In addition, a description of the casing failure can be used to better estimate the amount and rate of leak. Defining ranges or percentages that best represent most failures is an option. Geometry of the failure in respect to formation type is another option. Using historical Inflow Performance Relationship curves for the well would result in better understanding pressure losses and flow rate of the leak. Type of casing (steel type), depth of well, and type of well: vertical or horizontal are other variables that need to be considered.

In respect to the heterogeneity of formation and geological layers, defining stages with homogenous properties every certain distance will result in reducing the high uncertainty associated with the complexity of formation layers. The homogenous layers can be defined based on having the same temperature and pressure, geological properties, and the movement of fluid is subjected to steady state equations. Also, pseudo and transient equations can be applied at transition zones between the homogenous stages.

The invention claimed is:

1. A method to determine a testing zone around an oil or gas well, the method comprising:
   receiving, by data processing apparatus, a plurality of first variables associated with an oil or gas well, the plurality of first variables including one or more first variables associated with a location of the oil or gas well and one or more first variables associated with an age of the oil or gas well;
   receiving, by the data processing apparatus, a plurality of second variables associated with an entity performing hydraulic fracturing in the oil or gas well, the plurality of second variables including one or more second variables associated with a past contamination history of the entity;
   receiving, by the data processing apparatus, a plurality of third variables associated with inhabitable regions surrounding the oil or gas well, the plurality of third variables including one or more third variables associated with a number of inhabitable regions surrounding the oil or gas well and one or more third variables associated with a distance of the inhabitable regions from the oil or gas well;
   processing, by the data processing apparatus, the plurality of first variables, the plurality of second variables, and the plurality of third variables;
   in response to processing the plurality of first variables, the plurality of second variables, and the plurality of third variables, determining, by the data processing apparatus, a zone around the oil or gas well within which to test for contamination due to the hydraulic fracturing in the oil or gas well; and
   collecting a test sample from within the determined zone to test for contamination due to the hydraulic fracturing in the oil or gas well.

2. The method of claim 1, wherein the zone is a substantially circular region having the oil or gas well at a center, and wherein determining the zone comprises determining a radius of the substantially circular region within which to test for the contamination.

3. The method of claim 1, wherein the zone is a non-circular region having the oil or gas well at a geometric center, and wherein determining the zone comprises determining a distance from the geometric center to a boundary of the zone within which to test for the contamination.

4. The method of claim 1, further comprising:
   identifying a minimum testing distance from the oil or gas well established by government regulations to test for contamination;
   determining that a distance from the oil or gas well to a boundary of the zone is less than the minimum testing distance; and
   over-writing the distance from the oil or gas well to the boundary of the zone with the minimum testing distance.

5. The method of claim 1, wherein the one or more second variables associated with the past contamination history of the entity comprises a number of well violations (WV) and a number of contamination claims (CC), wherein the method further comprises:
   receiving a plurality of fourth variables associated with the oil or gas well, the plurality of fourth variables including one or more fourth variables describing a number of active wells (AA), one or more fourth variables describing a number of orphaned wells surrounding the oil or gas well (OW), one or more fourth variables describing a number of injected wells surrounding the oil or gas well (IW); and
   processing the plurality of second variables and the plurality of fourth variables to determine a first potential travel distance (D1) for a contaminant from the oil or gas well.

6. The method of claim 5, wherein determining the first potential travel distance for the contaminant comprises determining the first potential travel distance using the following equation $$D1 = \Sigma(AA \times PwFail \times C1) + (OW \times PwFail \times C2) + (IW \times PwFail \times C3) + (WV \times C4) + (CC \times C5)$$

in which PwFail is the probability of well failure and C1, C2, C3, C4, and C5 are coefficients.

7. The method of claim 5, further comprising:
   receiving a distance from water acquifer to fracturing zone in the oil or gas well (DAZ) and a number of naturally occurring faults (NAF); and
   processing the distance from the water acquifer to the fracturing zone in the oil or gas well and the number of naturally occurring faults to determine a second potential travel distance (D2) for the contaminant from the oil or gas well.

8. The method of claim 7, wherein determining the second potential travel distance comprises determining the second potential travel distance using the following equation:

$$D2 = DAZ \times NAF.$$

9. The method of claim 7, further comprising:
receiving a porosity of a reservoir into which hydraulic fracturing fluids are flowed (PR) and an amount of fracturing fluid flowed into the reservoir (FF); and
processing the porosity of the reservoir and the amount of fracturing fluid to determine a third potential travel distance (D3) for the contaminant from the oil or gas well.

10. The method of claim 9, wherein at least one of the plurality of first variables, the second plurality of variables or the third plurality of variables include a well spacing (WS), a population density (PD), oil company risk tolerance (OCRT), oil company violation history (OCVH), and wherein the method further comprises processing the well spacing, the population density, the oil company risk tolerance, and the oil company violation history to determine a fourth potential travel distance (D4) for the contaminant from the oil or gas well.

11. The method of claim 10, wherein determining the fourth potential travel distance comprises determining the fourth potential travel distance using the following equation:

$$D4 = WS + PD + OCRT + OCVH.$$

12. The method of claim 10, wherein determining a zone around the oil or gas well within which to test for contamination due to the hydraulic fracturing in the oil or gas well comprises:
determining a sum of the first potential travel distance, second potential travel distance, third potential travel distance, and fourth potential travel distance; and
assigning the sum as the distance in the zone within which to test for the contamination.

13. The method of claim 10, further comprising:
receiving an estimate of pressure and temperature along the oil or gas well and potential failure or pressure losses in the oil or gas well; and
determining the zone around the oil or gas well within which to test for contamination due to the hydraulic fracturing in the oil or gas well based on the estimate of the pressure and the temperature and the potential failure or the pressure losses.

14. The method of claim 7, wherein determining the third potential travel distance comprises determining the third potential travel distance using the following equation:

$$D3 = PR \times FF.$$

15. A system comprising:
a data processing apparatus; and
a non-transitory computer-readable medium storing instructions executable by the data processing apparatus to perform operations for determining a testing zone around an oil or gas well, the operations comprising:
receiving a plurality of first variables associated with an oil or gas well, the plurality of first variables including one or more first variables associated with a location of the oil or gas well and one or more first variables associated with an age of the oil or gas well;
receiving a plurality of second variables associated with an entity performing hydraulic fracturing in the oil or gas well, the plurality of second variables including one or more second variables associated with a past contamination history of the entity;
receiving a plurality of third variables associated with inhabitable regions surrounding the oil or gas well, the plurality of third variables including one or more third variables associated with a number of inhabitable regions surrounding the oil or gas well and one or more third variables associated with a distance of the inhabitable regions from the oil or gas well;
processing the plurality of first variables, the plurality of second variables, and the plurality of third variables; and
in response to processing the plurality of first variables, the plurality of second variables, and the plurality of third variables, determining a zone around the oil or gas well within which to test for contamination due to the hydraulic fracturing in the oil or gas well; and
a sample collection system configured to collect a test sample from within the determined zone to test.

16. The system of claim 15, wherein the one or more second variables associated with the past contamination history of the entity comprises a number of well violations (WV) and a number of contamination claims (CC), wherein the method further comprises:
receiving a plurality of fourth variables associated with the oil or gas well, the plurality of fourth variables including one or more fourth variables describing a number of active wells (AA), one or more fourth variables describing a number of orphaned wells surrounding the oil or gas well (OW), one or more fourth variables describing a number of injected wells surrounding the oil or gas well (IW); and
processing the plurality of second variables and the plurality of fourth variables to determine a first potential travel distance (D1) for a contaminant from the oil or gas well using the following equation $$D1 = \Sigma(AA \times PwFail \times C1) + (OW \times PwFail \times C2) + (IW \times PwFail \times C3) + (WV \times C4) + (CC \times C5)$$

in which PwFail is the probability of well failure and C1, C2, C3, C4, and C5 are coefficients.

17. The system of claim 16, the operations further comprising:
receiving a distance from water acquifer to fracturing zone in the oil or gas well (DAZ) and a number of naturally occurring faults (NAF); and
processing the distance from the water acquifer to the fracturing zone in the oil or gas well and the number of naturally occurring faults to determine a second potential travel distance (D2) for the contaminant from the oil or gas well using the following equation:

$$D2 = DAZ \times NAF.$$

18. The system of claim 17, the operations further comprising:
receiving a porosity of a reservoir into which hydraulic fracturing fluids are flowed (PR) and an amount of fracturing fluid flowed into the reservoir (FF); and
processing the porosity of the reservoir and the amount of fracturing fluid to determine a third potential travel distance (D3) for the contaminant from the oil or gas well using the following equation:

$$D5 = PR \times FF.$$

19. The system of claim 18, wherein at least one of the plurality of first variables, the second plurality of variables or the third plurality of variables include a well spacing (WS), a population density (PD), oil company risk tolerance (OCRT), oil company violation history (OCVH), and wherein the method further comprises processing the well spacing, the population density, the oil company risk tolerance, and the oil company violation history to determine a fourth potential travel distance (D4) for the contaminant from the oil or gas well using the following equation:

$$D4=WS+PD+OCRT+OCVH.$$

20. The system of claim 19, wherein determining a zone around the oil or gas well within which to test for contamination due to the hydraulic fracturing in the oil or gas well comprises:
    determining a sum of the first potential travel distance, second potential travel distance, third potential travel distance, and fourth potential travel distance; and
    assigning the sum as the distance in the zone within which to test for the contamination.

* * * * *